United States Patent [19]
Chang et al.

[11] Patent Number: 6,111,855
[45] Date of Patent: Aug. 29, 2000

[54] METHOD AND APPARATUS FOR BAUD DETECTION IN A COMMUNICATION DEVICE

[75] Inventors: Chun-Ye Susan Chang, Boynton Beach; Clinton C Powell, II, Lake Worth, both of Fla.

[73] Assignee: Motorola, Schaumburg, Ill.

[21] Appl. No.: 09/128,161

[22] Filed: Aug. 3, 1998

[51] Int. Cl.[7] ...................................................... H04J 3/14
[52] U.S. Cl. ...................... 370/232; 370/210; 370/252; 370/465; 375/225; 375/340; 375/364
[58] Field of Search .................................. 370/204, 213, 370/232, 233, 234, 252, 295, 376, 458, 465, 210; 375/222, 340, 343, 364, 225, 227

[56] References Cited

U.S. PATENT DOCUMENTS

| | | | |
|---|---|---|---|
| 3,747,074 | 7/1973 | Schulye | 370/252 |
| 3,916,324 | 10/1975 | Shuda | 375/343 |
| 4,866,738 | 9/1989 | Wiesmann et al. | 370/213 |
| 5,077,758 | 12/1991 | DeLuca et al. | 375/95 |
| 5,095,498 | 3/1992 | DeLuca et al. | 375/94 |
| 5,218,619 | 6/1993 | Dent | 370/210 |
| 5,627,858 | 5/1997 | Mak et al. | 370/252 |
| 5,724,389 | 3/1998 | Marko et al. | 375/340 |

*Primary Examiner*—Douglas W. Olms
*Assistant Examiner*—Shick Hom
*Attorney, Agent, or Firm*—Pablo Meles

[57] ABSTRACT

A method (500) of baud detection in a communication device (700) includes the steps of sorting phase pulses among overlapping sets of time slots (502) and counting phase pulses within each of the overlapping sets of time slots creating corresponding counter values (504). Then, counter values are compared with predetermined thresholds (506–512), wherein a baud pass condition (570) is met when at least one counter has a counter value exceeding an upper threshold and wherein a counter N/2 positions away has a counter value below a lower threshold. The baud pass condition may he further conditioned on meeting the requirement that at least another counter value falls below a middle threshold.

19 Claims, 4 Drawing Sheets

METHOD AND APPARATUS FOR BAUD DETECTION IN A COMMUNICATION DEVICE

FIELD OF THE INVENTION

The present invention is directed to baud detection, and more particularly to a communication device and method capable of accurately sensing baud for a given protocol.

BACKGROUND OF THE INVENTION

The Maximum Likelihood Detector which is also known as the Optimum Noncoherent Detector (or correlation detector) for detecting FSK signals in an additive white gaussian noise channel is well known. The performance of a correlation detector can also be achieved with other detector architectures such as a Matched Filter or a Fast Fourier Transform (FFT). These detectors have the ability to achieve a significant sensitivity improvement (i.e., 4 dB) over that of discriminators for M-level orthogonal signaling (i.e. FLEX™). Traditional baud detectors (i.e., SKUNK detectors) based on edges of the recovered audio signal can not be employed since they do not operate well at the lower sensitivity levels that are achievable by these optimum detectors. This brings the challenge of designing a baud detector that can operate at lower levels. Thus, what is needed is a baud detector algorithm that is capable of detecting all four FLEX™ signaling rates (1600 symbols/sec (2 or 4 level) and 3200 symbols/sec (2 or 4 level)) at and above their respective sensitivity levels while rejecting noise, POCSAG, as well as ReFLEX™ signals.

DESCRIPTION OF A PREFERRED EMBODIMENT

Figure 1:
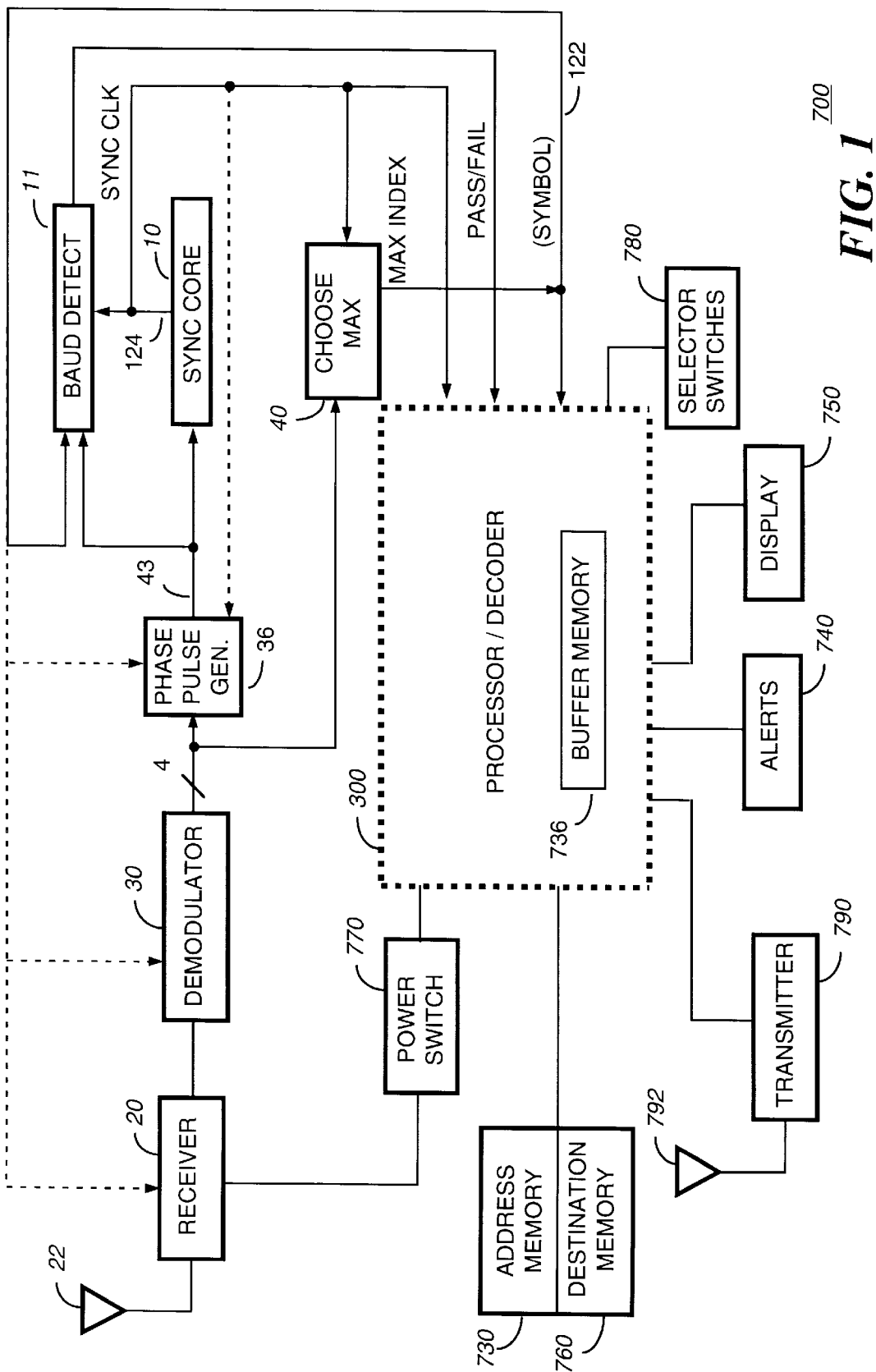
FIG. 1 is a block diagram of a selective call receiver including an accurate synchronization device with symbol decision feedback in accordance with the present invention.

FIG. 1 illustrates a selective call receive (such as a pager) 700 utilizing a circuit for providing accurate baud detection which preferably comprises a demodulator or detector or correlator 30 (that may have multiple correlators for multi-level symbols, (4 levels indicated in FIG. 1)) among other things. The selective call receiver 700 further comprises a processor 300 that controls many of the functions required in a selective call receiver such as decoding. It should be understood that the functions of synchronizing, decoding, and baud detecting could be achieved through the use of the processor or respective stand-alone synchronizer, decoder, and detector circuits without the use of the processor 300.

The selective call receiver 700 preferably comprises a receiver 20 for receiving RF signals detected by antenna 22. The received signal output by the receiver 20 is connected to the detector or demodulator (or correlator) 30. The demodulator 30 outputs the demodulated signal to a correlator selector 40 that selects the corresponding correlator having the maximum amplitude to provide a maximum index. The demodulator 30 also outputs the demodulated signal to a phase pulse generator 36 that provides a phase pulse signal 43 to a sync core circuit 10 and a baud detector circuit 11. The sync core circuit 10 issues sync clock pulses (124) to the processor 300 as well as the baud detector circuit 11 and the correlator selector 40 and the phase pulse generator 36.

The processor 300 is a controller which may include a decoder function that decodes the digital data in accordance with protocol rules established for example, by Motorola's FLEX™ paging protocol. For example, the decoder outputs corresponding address information, message information and/or control information. The processor 300 preferably incorporates the decoder function and is the control point for the selective call receiver 700. Among other things, the processor 300 may control the receiver 20), demodulator 30, the baud detector circuit 11, as well as the phase pulse generator 36. The processor 300 compares received address information with predetermined addresses stored in an address memory 730 in order to trigger one of the alerts 740 or to display a received text or graphics message on display 750. In addition, messages are preferably stored in a destination memory 760. The processor 300 may also include buffer memory 736 for storing previous symbol decisions or phase values. The processor 300 also is connected to a power switch 770 to shut down the receiver 20 and other components of the selective call receiver during periods of time when the particular selective call receiver is not expected to receive information. A user interface to the selective call receiver 700 is achieved through selector switches 780. The selective call receiver may also have acknowledge-back or reverse channel transmitting capability, and accordingly may comprise a transmitter 790 and a transmitting antenna 792.

The series of equations and algorithms used in the processor 300 above can be implemented in many ways, such as by hardware circuits, a digital signal processor. computer software, microprocessor instructions, etc. Those with ordinary skill in the art will appreciate that other methods, in addition to those mentioned, are equally suitable. All or some of the circuits shown as part of selective call receiver including the processor 300 can be integrated onto a single application specific integrated circuit (ASIC), together with other signal processing functionalities.

The selective call device of FIG. 1 preferably uses symbol decision directed feedback synchronization that preferably uses the 4 correlator outputs along with MAX INDEX to determine the best sampling instance. The output of the phase pulse generator 36 provides the phase pulse signal 43 which is then sent to the sync core block 10. The sync core block 10 is used to control the loop bandwidth (adaptation rate) of a synchronizer function. It also generates a SYNC CLK 124 at an average periodic rate.

Figure 2:
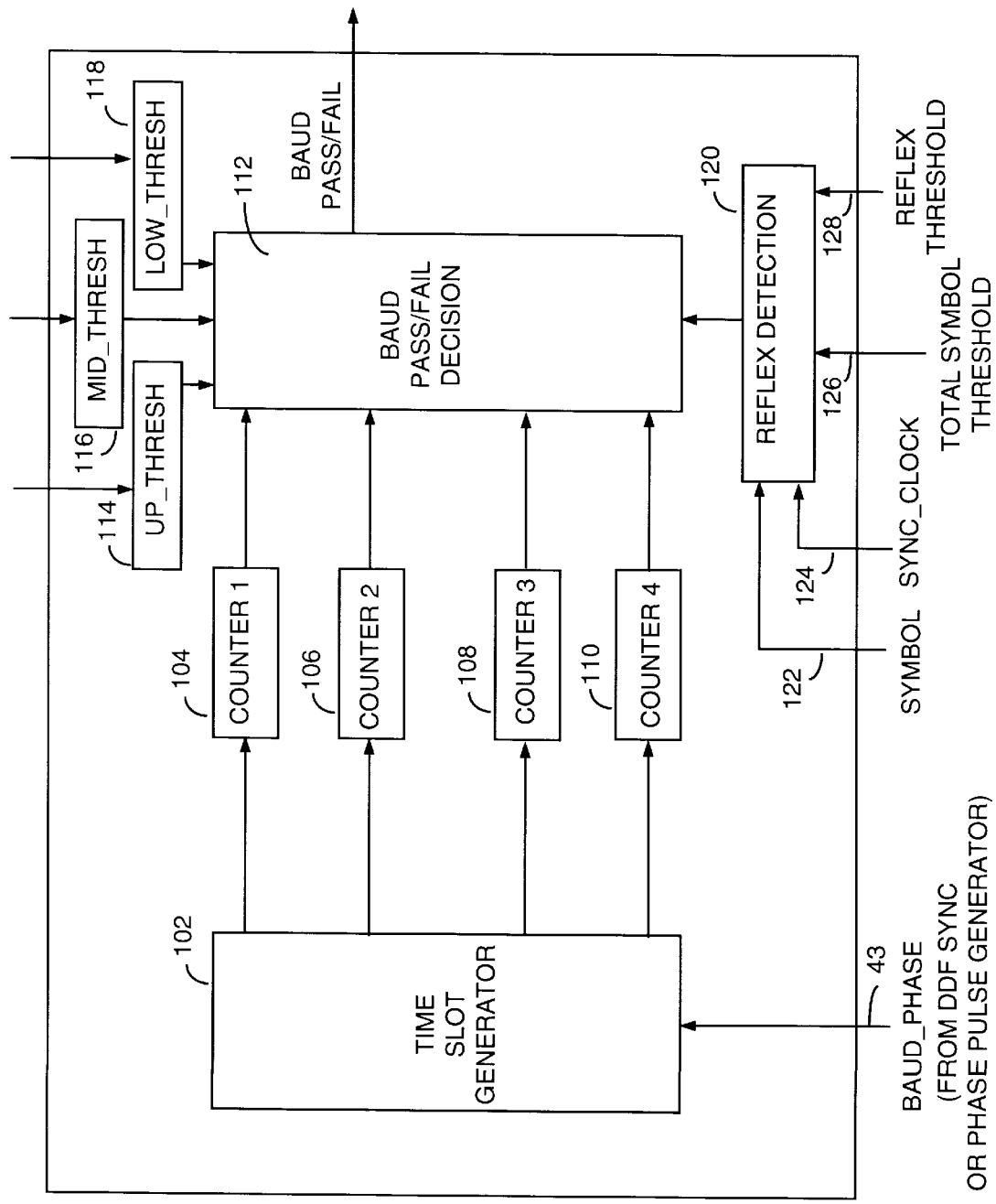
FIG. 2 is a block diagram of a baud detection circuit in accordance with the present invention.

FIG. 2 is a block diagram of the baud detector 11 of FIG. 1. The phase pulses (43) from the phase pulse generator 36 (preferably from a DDF synchronizer as disclosed in U.S. patent application Ser. No. 09/076.992 which is incorporated by reference and assigned to the assignee herein) give the peak position of the correlator corresponding to the current symbol decision. These correlation peaks correspond to the symbol edges. A 3200 symbol/second (or 1600 symbol/second) symbol is divided into four (4) time slots. If these phase pulses occur roughly at the same time slot, a 3200 baud (or 1600 baud) signal is detected. If they are randomly spread over all 4 time slots then signals of other baud rates or noise are probably being received. In this way FLEX™ signals can be distinguished from POCSAG signals, noise and interferers of other baud rates. However, with a strong POCSAG 2400 signal, the phase pulses are sometimes distributed over 3 out of 4 time slots (or bins) With just an upper and a lower threshold, a strong POCSAG 2400 signal would pass the baud detect and create a high falsing rate. The thresholds can be adjusted to supress the POCSAG falsing rate at the expense of the FLEX™ signal pass rate. Thus, a middle threshold criteria can be added to reduce the falsing rate of POCSAG signals. Further, beyond the instances where the upper threshold was surpassed on three time slots or bins, modifications should be considered for pulses jittering among slot boundaries. In the case where 15 samples are taken in a symbol time, N time slots or bins (in this case 4 time slots) can be modified to contain 5 samples each with one or two samples overlapping on adjacent slots as shown below:

<u>0 1 2 3 4</u>                    <u>0 1 2 3 4</u>
  <u>4 5 6 7 8</u>
       <u>8 9 10 11 12</u>
              <u>12 13 14 0 1</u>

As shown, sample #4 of bins 1 and 2 overlap, sample #8 of bins 2 and 3 overlap, sample #12 of bins 3 and 4 overlap, and samples #0 and #1 of bins 4 and 1 overlap.

Referring to FIG. 2, in implementation, the 15 time slots are generated by a time slot generator 102 within the baud detector 11. The foul bins are created by means of four corresponding counters 104, 106, 108 and 110. The baud pass or fail decision process is preferably achieved through a processor 112 having an algorithm that continuously monitors several thresholds. The algorithm should also have a maximum time to detect baud. In other words a time out feature that could be for example 128 symbols (40 msecs in the case of 3200 symbols/sec or 80 msecs in the case of 1600 symbols/sec). First the number of phase pulses in each of the 4 time slots divided from a desired symbol rate are accumulated. During the accumulation, the 4 counter values are continuously compared with an upper threshold 114, a middle threshold 116, and a lower threshold 118. Thus, the method or algorithm of baud detection in a communication device preferably comprises sorting phase pulses among overlapping sets of time slots and subsequently counting phase pulses within each of the overlapping sets of time slots creating corresponding counter values. These counter values are then compared with predetermined thresholds, wherein a baud pass condition is met when at least one counter value exceeds the upper threshold 114 and where the counter value of a counter N/2 positions away (from the reference counter exceeding the upper threshold in this instance) falls below a lower threshold 118. "N" represents the total number of counters which are preferably numbered in sequential order and thus a baud detection circuit in accordance with the present invention with 4 counters for example would need to see if a counter 2 positions away (N/2 positions away) from the counter exceeding the tipper threshold has a value falling below a lower threshold to find a baud pass condition. In other words, a reference counter position is shifted by N/2 (either a logical left or logical right barrel shift). Preferably the total number of counters N is an even number, otherwise the present invention could easily be modified to take the integer value of N/2 as contemplated within the scope of the invention. The algorithm may further optionally comprise the step of creating a baud pass condition (successful FLEX™ baud detection for example) upon further meeting the condition that at least another counter value falls below the middle threshold 116. It should be noted that a baud fail condition exists when all counter values exceed the lower threshold or N−1 or N counter values exceed the middle threshold. Also, a baud fail condition exists when no baud fail conditions or no baud pass conditions have been met within a predetermined time limit (in other words, a time out period). It should be noted that the sorting of the phase pulses is done in the time domain. Optionally, sorting can simultaneously be done in the frequency domain wherein a baud fail condition can be created if a disproportionate amount of energy is found in a predetermined set of counters, particularly a middle set of counters. This is most useful in rejecting ReFLEX® signals that may have the same baud rate as a desired FLEX™ baud rate, but an unrecognized frequency distribution (by a FLEX™ decoder) after sorting a received signal in the frequency domain. Thus, in decision block 120 (or in this case, the ReFLEX® detection block), energy in disproportionate amounts is detected in the frequency domain by setting thresholds for a predetermined number (signal 128 of FIG. 2) of symbols typically found in a ReFLEX® signal out of a total number of predetermined symbols (signal 126 of FIG. 2) which would typically be equivalent to the upper threshold 114.

Figure 3:
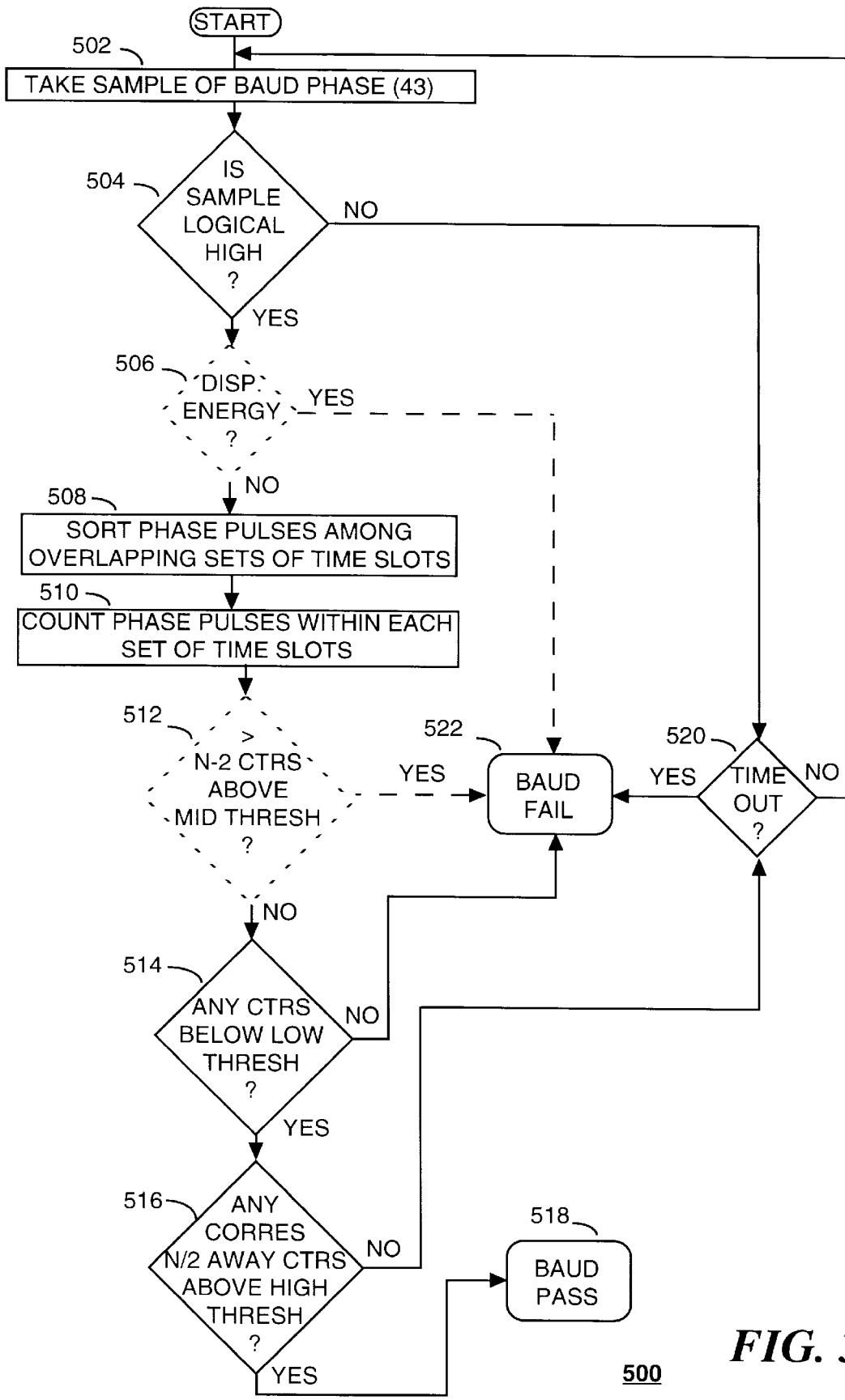
FIG. 3 is a flow chart illustrating a method for baud detection in accordance with the present invention.

Referring to FIG. 3, an flow chart is shown illustrating an method 500 of baud detection in a communication device comprising the steps of taking a sample of the baud phase (43) at step 502 and determining whether the sample is a logical high at decision block 504. If the sample is low at decision block 504 and a time out period is not exceeded, then the next sample of the baud phase is taken at block 502. If the sample is low at decision block 504 and a time out period is exceeded, then a baud fail (522) condition exists. If the sample at decision block 504 is a logical high, then it is optionally determined if there is a disproportionate amount of energy found in a predetermined set of counters. In other words, in this example it is determined whether the received signal is an undesired ReFLEX® signal at decision block 506. If a ReFLEX® signal is found at decision block 506, then a baud fail condition 522 exists. A ReFLEX® signal would have the same baud rate as a desired FLEX™ signal, but the ReFLEX®m signal would have a different frequency (or energy) distribution as can be observed when sorting and counting in the frequency domain (which can be done simultaneously with the sorting and counting hi the time domain as done in steps 508 and 510). If no disproportionate distribution of energy is found at decision block 506 (not a ReFLEX® signal for example), then the method proceeds by sorting phase pulses (in the time domain) among overlapping sets of time slots at step 508 and then counting phase pulses within each of the overlapping sets of time slots at step 510 creating corresponding counter values.

The method 500 optionally proceeds at decision block 512 to determine if there are greater than N−2 counters above a middle threshold, whereupon a baud fail condition (522) will also exist (where N equals the total number of counters). However, if at the optional decision block 512, N−2 or fewer counters are above a middle threshold then the method proceeds to decision block 514. Then, at decision block 514, if none of the counters are below the lower threshold a baud fail condition will exist. If at least one counter is below the lower threshold at decision block 514, then the method proceeds to decision block 516.

If any of the remaining counters N/2 counter positions away from the counter falling below the lower threshold at decision block 514 exceed the upper threshold at decision block 516, then a baud pass condition exists (518). If none of the counters N/2 positions away exceed the upper threshold at decision block 516, then the time out condition is then checked at decision block 520. If all the required baud pass conditions are not met within a predetermined time-out period (520), then a baud fail condition (522) will be given. It should be understood that the time out condition can be checked more or less frequently or at different junctures within the method 500 and still be within contemplation of the present invention as claimed.

Figure 4:
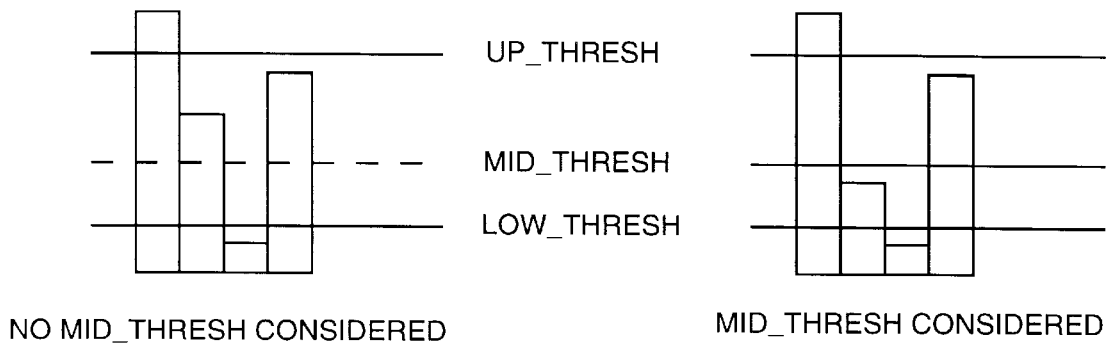
FIG. 4 is a bar graph illustrating baud pass conditions in accordance with the present invention.
Figure 5:
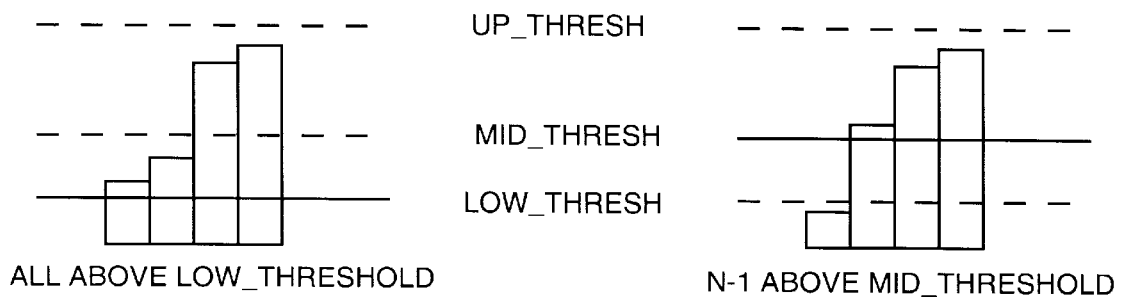
FIG. 5 is a bat graph illustrating baud fail conditions in accordance with the present invention.

Thus, a baud pass condition (518) is met when at least one counter is below a lower threshold at decision block 514 and a counter N/2 positions away is above an upper threshold at decision block 516. Optionally, the baud pass may be further conditioned on at least one other counter falling below a middle threshold at decision block 512. A baud fail condition (522) will exist when none of the counters are below the lower threshold at decision block 514, or optionally when N−1 or more counters are above the middle threshold at decision block 512. A baud tail condition exists when disproportionate energy is found at decision block 506. Additionally, a baud fail condition will also exist if a time out condition is met after a high sample is found at decision block 504 or after failing to find any counters N/2 away that falls above a high threshold at block 516. FIGS. 4 and 5 also illustrate a bar graph showing when baud pass and baud fail conditions are met.

The above description is intended by way of example only and is not intended to limit the present invention in any way except as set forth in the following claims.

What is claimed is:

1. A method of baud detection in a communication device, comprising the steps of:

sorting phase pulses among overlapping sets of time slots;

counting phase pulses within each of the overlapping sets of time slots creating corresponding counter values; and comparing counter values with predetermined thresholds, wherein a baud pass condition is met when at least one counter value of a counter exceeds an upper threshold and wherein a counter value of another counter N/2 positions away falls below a lower threshold.

2. The method of claim 1, wherein the comparing step further comprises the step of only creating the baud pass upon further meeting the condition that at least another counter value falls below a middle threshold.

3. The method of claim 1, wherein the comparing step further comprises the step of creating a baud fail condition when all counter values exceed the lower threshold.

4. The method of claim 1, wherein the step of comparing further comprises the step of creating a baud fail condition when all counters less one exceeds a middle threshold.

5. The method of claim 1, wherein the comparing step further comprises the step of creating a baud fail when no baud fail conditions or no baud pass conditions have been met within a predetermined time limit.

6. The method of claim 1 wherein the step of sorting the phase pulses comprises sorting in the time domain.

7. The method of claim 1, wherein the method further comprises the step of sorting in the frequency domain and creating, a baud fail condition if a disproportionate amount of energy is found in a predetermined set of counters.

8. The method of claim 7 wherein the predetermined set of counters is a middle set of counters.

9. A baud detection circuit for a wireless communication device, comprising:

a time slot generator for sorting phase pulses among overlapping sets of time slots received from a baud phase input;

a plurality of counters corresponding to the overlapping sets of time slots for counting phase pulses within each of the overlapping sets of time slots creating corresponding counter values;

a processor programmed to compare counter values with predetermined thresholds, wherein a baud pass condition is met when at least one counter has a counter value exceeding an upper threshold and wherein another counter N/2 positions away has a counter value below a lower threshold.

10. The baud detection circuit of claim 9, wherein the processor is further programmed to create the baud pass upon further meeting the condition that at least another counter has a counter value below a middle threshold.

11. The baud detection circuit of claim 9, wherein the processor is further programmed to create a baud fail condition when all counter values exceed the lower threshold.

12. The method of claim 9, wherein the step of comparing further comprises the step of creating a baud fail condition when all counters less one exceeds a middle threshold.

13. The baud detection circuit of claim 9, wherein the processor is further programmed to create a baud fail condition when no baud fail conditions or no baud pass conditions have been met within a predetermined time limit.

14. The baud detection circuit of claim 9, wherein the time slot generator sorts the phase pulses in the time domain.

15. The baud detection circuit of claim 9, wherein the baud detection circuit further comprises a ReFLEX detection circuit for sorting in the frequency domain, wherein the processor creates a baud fail condition if a disproportionate amount of energy is found in a predetermined set of counters.

16. The baud detection circuit of claim 15, wherein the predetermined set of counters is a middle set of counters.

17. A selective call receiver unit, comprising:

a selective call receiver;

a demodulator coupled to the selective call receiver; and a baud detection circuit coupled to the demodulator, comprising:

a time slot generator for sorting phase pulses among overlapping sets of time slots received from a baud phase input;

a plurality of counters corresponding to the overlapping sets of time slots for counting phase pulses within each of the overlapping sets of time slots creating corresponding counter values; and a processor programmed to compare counter values with predetermined thresholds, wherein a baud pass condition is met when at least one counter has a counter value above an upper threshold abd wherein another counter N/2 positions away has a counter below a lower threhold.

18. The baud detection circuit of claim 15, wherein the processor is further programmed to create the baud pass upon further meeting the condition that at least another counter has a counter value below a middle threshold.

19. The baud detection circuit of claim 15, wherein the baud detection circuit further comprises a ReFLEX detection circuit for sorting in the frequency domain, wherein the processor creates a baud fail condition if a disproportionate amount of energy is found in a predetermined set of counters.

* * * * *